UNITED STATES PATENT OFFICE.

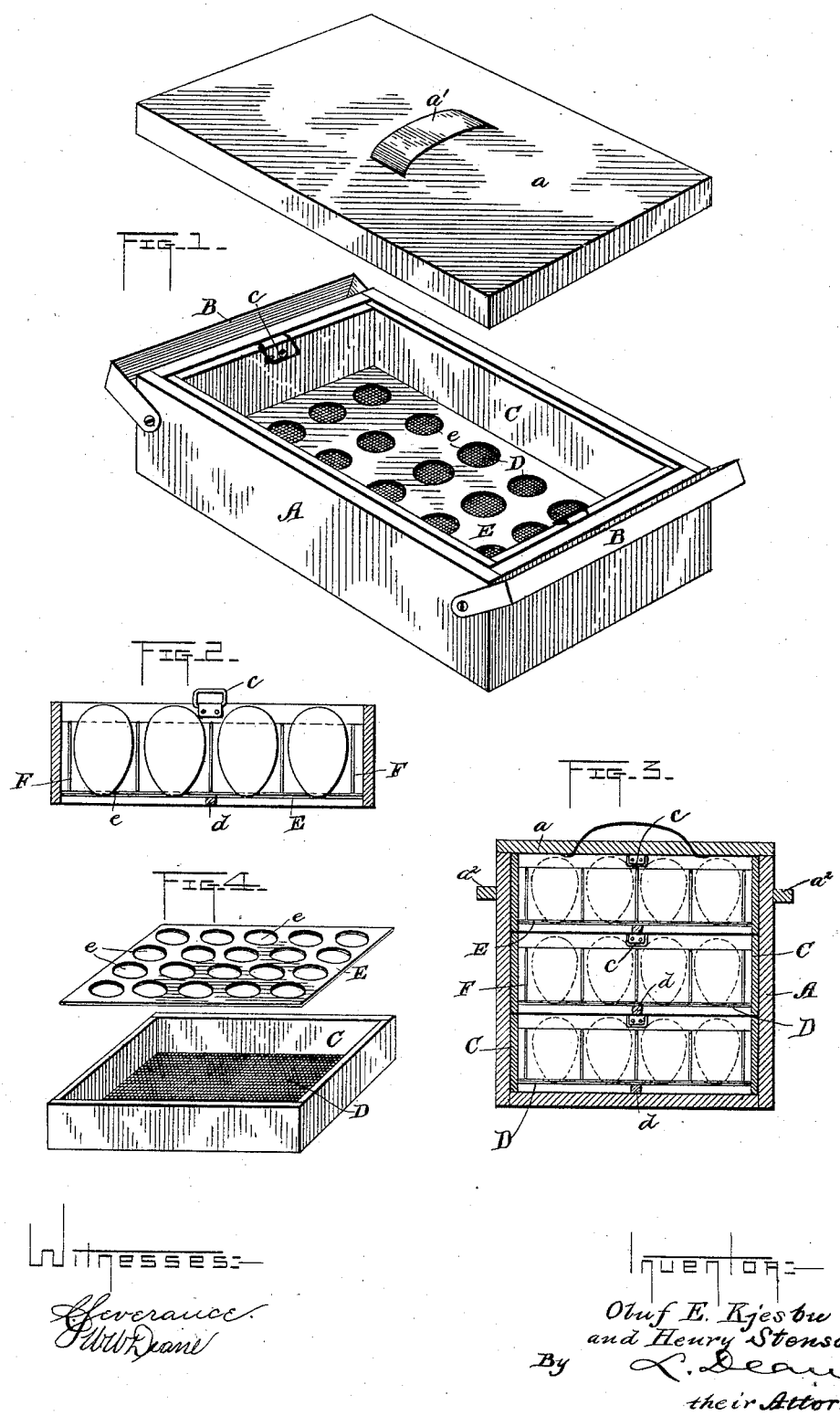

OLUF E. KJESBU AND HENRY STENSON, OF STARBUCK, MINNESOTA.

EGG-TRANSPORTING CRATE AND TRAY.

SPECIFICATION forming part of Letters Patent No. 430,477, dated June 17, 1890.

Application filed October 30, 1889. Serial No. 328,684. (No model.)

*To all whom it may concern:*

Be it known that we, OLUF E. KJESBU and HENRY STENSON, citizens of the United States, residing at Starbuck, in the county of Pope and State of Minnesota, have invented certain new and useful Improvements in Egg-Transporting Crates and Trays; and we do hereby declare the following to be a full, clear, and exact description of the invention, such as will enable others skilled in the art to which it appertains to make and use the same.

The invention relates to improvements in egg-carriers, the object being to provide means whereby, when the eggs are placed in the cells, their points may rest upon an elastic support and so be prevented from being broken by shaking or jar; and it consists in the construction and novel combination of parts hereinafter described, illustrated in the accompanying drawings, and pointed out in the claims hereto appended.

In the accompanying drawings, in which similar reference-letters designate corresponding parts, Figure 1 represents a perspective view of an egg-carrier embodying this invention, the cover and the egg-cells being removed. Fig. 2 is a vertical central section of one tray, eggs being shown in the cells. Fig. 3 is a central sectional view showing a case having several egg-trays. Fig. 4 is a perspective view of the tray with its fixed bottom and the detachable bottom.

Referring to the drawings by letter, A designates the outer casing of the carrier having the unflanged lid $a$ and the central handle, consisting, preferably, of a leather strap $a'$, with its ends inserted and fastened in slits in the lid $a$.

B B are metal straps with their end portions bent inward at right angles and pivoted upon the sides of the casing A near the top and respective ends thereof. The straps B can be turned up over the lid to retain it and the casing together when lifted by the handle $a'$ or cleats $a^2$, and can be turned off to separate casing and lid. The casing A has an imperforate bottom upon which the edges of the inner tray C rest, which tray has no lid or imperforate bottom. The said tray fits snugly within the casing A, and has at its end edges the swinging loops or handles $c$, by which means it and its contents are lifted from the casing A.

D is a woven-wire or gauze diaphragm with its edges secured to the sides and ends of the inner tray a slight distance above the lower edges thereof and supported at suitable points by cross-strips $d$, connecting the sides of the tray and flush with the lower edges thereof.

E is a removable bottom resting in the tray C upon the gauze diaphragm and provided with the rows of equidistant circular openings $e$ for the points of the eggs. The cross-strips $d$ are never arranged directly below said openings.

F F are the egg-cells of the usual rectangular shape, of pasteboard or other suitable material, and made in the usual manner. The said series of cells fit within the tray with the open bottoms of each cell over one of the openings $e$. It is evident that an egg placed in one of said cells will rest at its point, which passes through the corresponding opening $e$ of the bottom E, upon the woven-wire or gauze diaphragm D and will be upheld thereby, and as the said diaphragm is elastic and will give or yield when the casing is shaken or jarred, it will prevent the shock or jar from breaking the eggs.

Any convenient number—three or more—of said trays C may be placed one above the other in the outer casing, the trays being made just wide enough to permit the eggs to bear lightly at each end upon adjacent woven-wire diaphragms.

The trays are made to fit the inside of the case, which keeps them firmly in place, and at the same time they strengthen the case and render it very durable. They are easily taken out by means of the wire loop at each end. There being no partition in this case, our tray is made to cover the entire drawer. The tray will be more durable, because when the eggs are removed it is put back in its place and there is nothing to break or mutilate it while in the case.

We do not confine ourselves to wire mesh, for any elastic or spongy material will answer all the desired ends.

Having described our invention, we claim—

1. In an egg-carrier, the combination, with the outer casing having an imperforate bottom, of the inner tray open at top and bottom and fitting snugly within the outer casing, the diaphragm of woven wire secured within the inner tray a suitable distance above the lower edge of said casing, the removable bottom having rows of equidistant openings seated on the wire diaphragm, and the egg-cells seated on said removable bottom, substantially as specified.

2. The herein-described egg-carrier, composed of the outer casing A and its cover, the interior tray C, having the swinging end handles c, the fixed diaphragm D, of woven wire, the removable bottom E, having the rows of equidistant perforations e and resting on said fixed diaphragm, and the series of egg-cells F, seated upon said removable bottom, substantially as specified.

3. In an egg-carrier, an inner tray having a diaphragm of woven wire or elastic material, combined with the perforated and removable bottom which rests upon said diaphragm, and with the egg-cells, substantially in the manner and for the purposes set forth.

4. In an egg-carrier, a series of trays for eggs, each having a woven-wire or other elastic diaphragm and a removable and perforated bottom resting thereon, and egg-cells, each of said trays being placed one above the other, whereby each egg has above and below its ends an elastic material, substantially as set forth.

In testimony whereof we affix our signatures in presence of two witnesses.

OLUF E. KJESBU.
HENRY STENSON.

Witnesses:
O. P. BERG,
LARS KOPPANG.